(12) United States Patent
Hong et al.

(10) Patent No.: US 11,287,655 B2
(45) Date of Patent: Mar. 29, 2022

(54) HOLOGRAPHIC DISPLAY APPARATUS AND METHOD FOR PROVIDING EXPANDED VIEWING WINDOW

(71) Applicant: SAMSUNG ELECTRONICS CO., LTD., Suwon-si (KR)

(72) Inventors: Jongyoung Hong, Suwon-si (KR); Wontaek Seo, Yongin-si (KR); Changkun Lee, Seoul (KR); Hongseok Lee, Seoul (KR); Hoon Song, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 103 days.

(21) Appl. No.: 16/742,425

(22) Filed: Jan. 14, 2020

(65) Prior Publication Data

US 2020/0400953 A1    Dec. 24, 2020

(30) Foreign Application Priority Data

Jun. 21, 2019  (KR) ................. 10-2019-0074198
Aug. 19, 2019  (KR) ................. 10-2019-0101133

(51) Int. Cl.
*G02B 27/01* (2006.01)
*F21V 8/00* (2006.01)
(Continued)

(52) U.S. Cl.
CPC ....... *G02B 27/0172* (2013.01); *G02B 6/0016* (2013.01); *G02B 6/0038* (2013.01);
(Continued)

(58) Field of Classification Search
CPC ......... G02B 2027/0178; G02B 27/017; G02B 2027/0174; G02B 27/0172;
(Continued)

(56) References Cited

U.S. PATENT DOCUMENTS 5,701,289 A * 12/1997 Nagano ................ G11B 7/124
                                                    369/112.09
7,949,214 B2 * 5/2011 DeJong ............. G02B 27/0081
                                                    385/31
(Continued)

FOREIGN PATENT DOCUMENTS

EP         3163379 A1    5/2017
KR   10-2017-0015375 A   2/2017
(Continued)

OTHER PUBLICATIONS

Park, J., et al., "Ultrathin wide-angle large-area digital 3D holographic display using a non-periodic photon Sieve", 2019, Nature Communications, 10(1), Article 1304, 8 pages total.
(Continued)

*Primary Examiner* — Daniel Chang
(74) *Attorney, Agent, or Firm* — Sughrue Mion, PLLC

(57) ABSTRACT

A holographic display apparatus includes a light guide plate including an input coupler and an output coupler, a holographic image generating assembly configured to generate a holographic image and provide the holographic image to the input coupler of the light guide plate, and an image processor configured to convert source image data based on a point spread function, which is obtained for each pixel of the holographic image on an image plane, to compensate for a blur of the holographic image output through the output coupler.

23 Claims, 21 Drawing Sheets

(51) Int. Cl.
*G03H 1/22* (2006.01)
*H04N 9/31* (2006.01)

(52) U.S. Cl.
CPC ......... *G03H 1/2205* (2013.01); *G03H 1/2294* (2013.01); *H04N 9/312* (2013.01); *H04N 9/3179* (2013.01); *H04N 9/3194* (2013.01); *G02B 2027/0123* (2013.01); *G02B 2027/0174* (2013.01); *G03H 2001/221* (2013.01); *G03H 2001/2207* (2013.01); *G03H 2001/2231* (2013.01); *G03H 2001/2234* (2013.01); *G03H 2001/2239* (2013.01); *G03H 2222/31* (2013.01); *G03H 2222/34* (2013.01); *G03H 2223/53* (2013.01); *G03H 2225/60* (2013.01); *G03H 2226/02* (2013.01)

(58) Field of Classification Search
CPC .......................... G02B 2027/011; G02B 27/01; G02B 27/283; G02B 27/4211; G02B 6/00; G03H 1/2294; G03H 1/0005; G06T 19/006; G06T 5/006; G06T 7/73
See application file for complete search history.

(56) References Cited

U.S. PATENT DOCUMENTS

| | | | |
|---|---|---|---|
| 8,379,079 B2 | 2/2013 | Kroll et al. | |
| 9,978,118 B1* | 5/2018 | Ozguner | G06F 12/128 |
| 10,088,802 B2 | 10/2018 | Kim et al. | |
| 10,510,188 B2 | 12/2019 | Schowengerdt et al. | |
| 10,571,862 B1* | 2/2020 | Alon-Braitbart | G03H 1/08 |
| 2006/0279662 A1 | 12/2006 | Kapellner et al. | |
| 2010/0061640 A1* | 3/2010 | Chen | G03H 1/22 |
| | | | 382/218 |
| 2010/0118360 A1* | 5/2010 | Leister | G03H 1/0808 |
| | | | 359/9 |
| 2011/0080496 A1* | 4/2011 | Givon | G03H 1/268 |
| | | | 348/222.1 |
| 2011/0222061 A1* | 9/2011 | Desserouer | G01J 3/1838 |
| | | | 356/328 |
| 2011/0251905 A1* | 10/2011 | Lawrence | G06F 3/0425 |
| | | | 705/15 |
| 2012/0008181 A1* | 1/2012 | Cable | G03H 1/2294 |
| | | | 359/9 |
| 2014/0160543 A1* | 6/2014 | Putilin | G02B 27/0103 |
| | | | 359/9 |
| 2015/0035880 A1 | 2/2015 | Heide et al. | |
| 2015/0205138 A1 | 7/2015 | Dobschal et al. | |
| 2015/0277125 A1* | 10/2015 | Hirano | G02B 6/0093 |
| | | | 359/633 |
| 2016/0041524 A1* | 2/2016 | Song | G03H 1/0808 |
| | | | 359/9 |
| 2016/0055822 A1 | 2/2016 | Bell | |
| 2016/0327906 A1* | 11/2016 | Futterer | G03H 1/02 |
| 2017/0010465 A1* | 1/2017 | Martinez | G02C 7/02 |
| 2017/0091916 A1* | 3/2017 | Kim | G06T 5/10 |
| 2017/0123204 A1* | 5/2017 | Sung | G02B 27/0103 |
| 2017/0357101 A1 | 12/2017 | Tervo et al. | |
| 2018/0114474 A1* | 4/2018 | Powell | G02F 1/133526 |
| 2018/0120563 A1 | 5/2018 | Kollin et al. | |
| 2019/0004478 A1* | 1/2019 | Gelman | G03H 1/2205 |
| 2019/0384056 A1* | 12/2019 | Wu | H04N 9/3185 |

FOREIGN PATENT DOCUMENTS

| | | |
|---|---|---|
| KR | 10-2017-0016158 A | 2/2017 |
| WO | WO-2019207350 A1 * 10/2019 | ......... G02B 27/0179 |

OTHER PUBLICATIONS

Communication dated Jul. 17, 2020, from the European Patent Office in counterpart European Application No. 20161898.0.
Blinder et al., "Signal processing challenges for digital holographic video display Systems", Signal Processing: Image Communication, 70, 2019, pp. 114-130, 17 pages total, XP011623599.
Itoh et al., "Gaussian Light Field: Estimation of Viewpoint-Dependent Blur for Optical See-Through Head-Mounted Displays", IEEE Transactions on Visualization and Computer Graphics, vol. 22, No. 11, Nov. 2016, pp. 2368-2376, 9 pages total, XP055660376.
Communication dated Aug. 25, 2021 issued by the European Intellectual Property Office in counterpart European Application No. 20 161 898.0.

* cited by examiner

HOLOGRAPHIC DISPLAY APPARATUS AND METHOD FOR PROVIDING EXPANDED VIEWING WINDOW

CROSS-REFERENCE TO RELATED APPLICATIONS

This application priority to Korean Patent Application No. 10-2019-0074198, filed on Jun. 21, 2019 and Korean Patent Application No. 10-2019-0101133, filed on Aug. 19, 2019, in the Korean Intellectual Property Office, the disclosures of which are incorporated herein in their entireties by reference.

BACKGROUND

1. Field

Example embodiments of the present disclosure relate to a holographic display apparatus and holographic display method, and more particularly, to a holographic display apparatus and holographic display method for providing an expanded viewing window.

2. Description of the Related Art

As methods of providing three-dimensional (3D) images, glasses methods and non-glasses methods are widely used. Examples of glasses methods include polarized glasses methods and shutter glasses methods, and examples of non-glasses methods include lenticular methods and parallax barrier methods. Such methods use binocular parallax and are limited in increasing the number of viewpoints. In addition, viewers viewing 3D images provided based on such methods may feel tired due to the difference between the depth the brain perceives and the focus of the eyes.

Recently, holographic methods, which are 3D image display methods capable of making the depth the brain perceives the same as the focus of the eyes and providing full parallax, have been gradually put to practical use. In such a holographic display method, reference light is emitted to a holographic pattern which records interference fringes formed by interference between reference light and object light reflected from an original object, and then images of the original object are reproduced by light diffracted by the holographic pattern. In currently practical holographic display methods, a computer generated hologram (CGH) is provided to a spatial light modulator as an electrical signal rather than obtaining a hologram pattern by directly exposing an original object to light. Then, the spatial light modulator may form a hologram pattern according to the input CGH signal and may diffract reference light using the hologram pattern to generate 3D images.

SUMMARY

According to an aspect of an example embodiment, there is provided a holographic display apparatus including a light guide plate including an input coupler and an output coupler, a holographic image generating assembly configured to generate a holographic image and provide the holographic image to the input coupler of the light guide plate, and an image processor configured to convert source image data based on a point spread function, which is obtained for each pixel of the holographic image on an image plane, to compensate for a blur of the holographic image output through the output coupler.

The light guide plate may include a first surface and a second surface which is opposite the first surface, and wherein the input coupler and the output coupler may be provided on the first surface.

The holographic image generating assembly may include a light source configured to emit light, and a spatial light modulator configured to modulate light emitted from the light source to generate a holographic image.

The spatial light modulator may be a reflective spatial light modulator configured to reflect and modulate light, and the holographic image generating assembly may further includes a beam splitter configured to transmit light emitted from the light source to the spatial light modulator and transmit light reflected by the spatial light modulator to the input coupler.

The beam splitter may be a polarization beam splitter configured to reflect light having a first linear polarization component and transmit light having a second linear polarization component which is orthogonal to the first linear polarization component.

The holographic image generating assembly may further include a quarter-wave plate between the beam splitter and the spatial light modulator.

The light source may include a first light source configured to emit light having the first linear polarization component and a second light source configured to emit light having the second linear polarization component, and the spatial light modulator may include a first spatial light modulator configured to modulate light reflected by the beam splitter and a second spatial light modulator configured to modulate light passing through the beam splitter.

The first spatial light modulator and the second spatial light modulator may be configured to operate in a time-division manner.

The spatial light modulator may be a transmissive spatial light modulator configured to transmit and modulate light.

The holographic image generating assembly may further include a lens configured to focus a holographic image provided by the spatial light modulator on the input coupler.

A distance between the lens and the input coupler and a distance between the lens and the spatial light modulator may be respectively equal to a focal length of the lens.

A distance between the lens and the input coupler is equal to a focal length of the lens, and a distance between the lens and the spatial light modulator may be greater than the focal length of the lens.

The holographic image generating assembly may further include a spatial filter provided to face the input coupler and configured to limit light incident on the input coupler.

The holographic image generating assembly may further include a spatial filter configured to remove undesired image noise and high order holographic images which are generated by the spatial light modulator, a first lens may be provided between the spatial light modulator and the spatial filter and configured to project light provided from the spatial light modulator onto the spatial filter, a second lens may be configured to transmit a holographic image passing through the spatial filter, and a third lens may be provided between the second lens and the input coupler of the light guide plate and configured to project the holographic image delivered from the second lens onto the input coupler.

The holographic display apparatus may further include a lens provided to face the output coupler and configured to project a holographic image output through the output coupler onto the image plane.

The light guide plate may further include an intermediate coupler provided in an optical path between the input coupler and the output coupler, wherein the input coupler is configured such that light input to the input coupler propagates in the light guide plate in a first direction, the intermediate coupler is configured such that light input to the intermediate coupler propagates in the light guide plate in a second direction orthogonal to the first direction, and the output coupler is configured such that light input to the output coupler is output from the light guide plate in a third direction orthogonal to the first direction and the second direction, respectively.

A width of the intermediate coupler in the first direction may be greater than a width of the input coupler in the first direction, and a width of the output coupler in the second direction may be greater than a width of the intermediate coupler in the second direction.

The image processor may be further configured to obtain a computer generated hologram (CGH) based on the converted source image data and provide a CGH signal to the spatial light modulator.

The image processor may include a first matrix which is previously obtained and stored, and a second matrix which is previously obtained and stored, and the image processor may be configured to convert first source image data having first depth information based on the first matrix and convert second source image data having second depth information based on the second matrix.

The first matrix and the second matrix may be previously obtained by estimating test holographic images to be reproduced on the image plane by obtaining point spread functions at every pixels respectively for a first depth based on first test source image data having the first depth information and a second depth based on second test source image data having the second depth information, comparing the test holographic image estimated for the first depth with a target holographic image for the first depth to correct the first test source image data to decrease a difference between the test holographic image and the target holographic image below a certain value, comparing the test holographic image estimated for the second depth with a target holographic image for the second depth to correct the second test source image data to decrease a difference between the test holographic image and the target holographic image below the certain value, obtaining the first matrix to convert the first test source image data into the corrected first test source image data, and obtaining the second matrix to convert the second test source image data into the corrected second test source image data.

According to an aspect of another example embodiment, there is provided a holographic display method including providing a computer generated hologram (CGH) signal to a spatial light modulator to generate a holographic image, providing the holographic image to an input coupler of a light guide plate, and reproducing, on an image plane, the holographic image which is propagated inside the light guide plate and is output through an output coupler of the light guide plate, wherein the providing of the CGH signal to the spatial light modulator includes converting source image data based on a point spread function, which is obtained using an image processor for each pixel of the holographic image on the image plane, to compensate for a blur of the holographic image output through the output coupler, and obtain a CGH based on the converted source image data.

The image processor may include a first matrix which is previously obtained and stored and a second matrix which is previously obtained and stored.

The holographic display method may further include converting first source image data having first depth information based on the first matrix, and converting second source image data having second depth information based on the second matrix.

The first matrix and the second matrix are previously obtained by estimating test holographic images to be reproduced on the image plane by obtaining per-pixel point spread functions respectively for a first depth based on first test source image data having the first depth information and a second depth based on second test source image data having second depth information, comparing the test holographic image estimated for the first depth with a target holographic image for the first depth to correct the first test source image data to decrease a difference between the test holographic image and the target holographic image below a certain value, comparing the test holographic image estimated for the first depth with a target holographic image for the second depth to correct the second test source image data to decrease a difference between the test holographic image and the target holographic image below the certain value, obtaining the first matrix to convert the first test source image data into the corrected first test source image data, and obtaining the second matrix to convert the second test source image data into the corrected second test source image data.

According to an aspect of another example embodiment, there is provided a holographic display apparatus including a light guide plate including an input coupler and an output coupler, a size of the output coupler being greater than a size of the input coupler, a holographic image generating assembly configured to generate a holographic image and provide the holographic image to the input coupler of the light guide plate, and an image processor configured to convert source image data having a depth information based on a matrix that is previously obtained and stored.

The matrix may be previously obtained by estimating test holographic images to be reproduced on the image plane by obtaining point spread functions at every pixels respectively for a depth based on test source image data having the depth information, comparing the test holographic image estimated for the depth with a target holographic image for the depth to correct the test source image data to decrease a difference between the test holographic image and the target holographic image below a certain value, and obtaining the matrix to convert the test source image data into the corrected test source image data.

BRIEF DESCRIPTION OF THE DRAWINGS

The above and/or other aspects, features, and advantages of example embodiments will be more apparent from the following description taken in conjunction with the accompanying drawings, in which.

DETAILED DESCRIPTION

Figure 1:
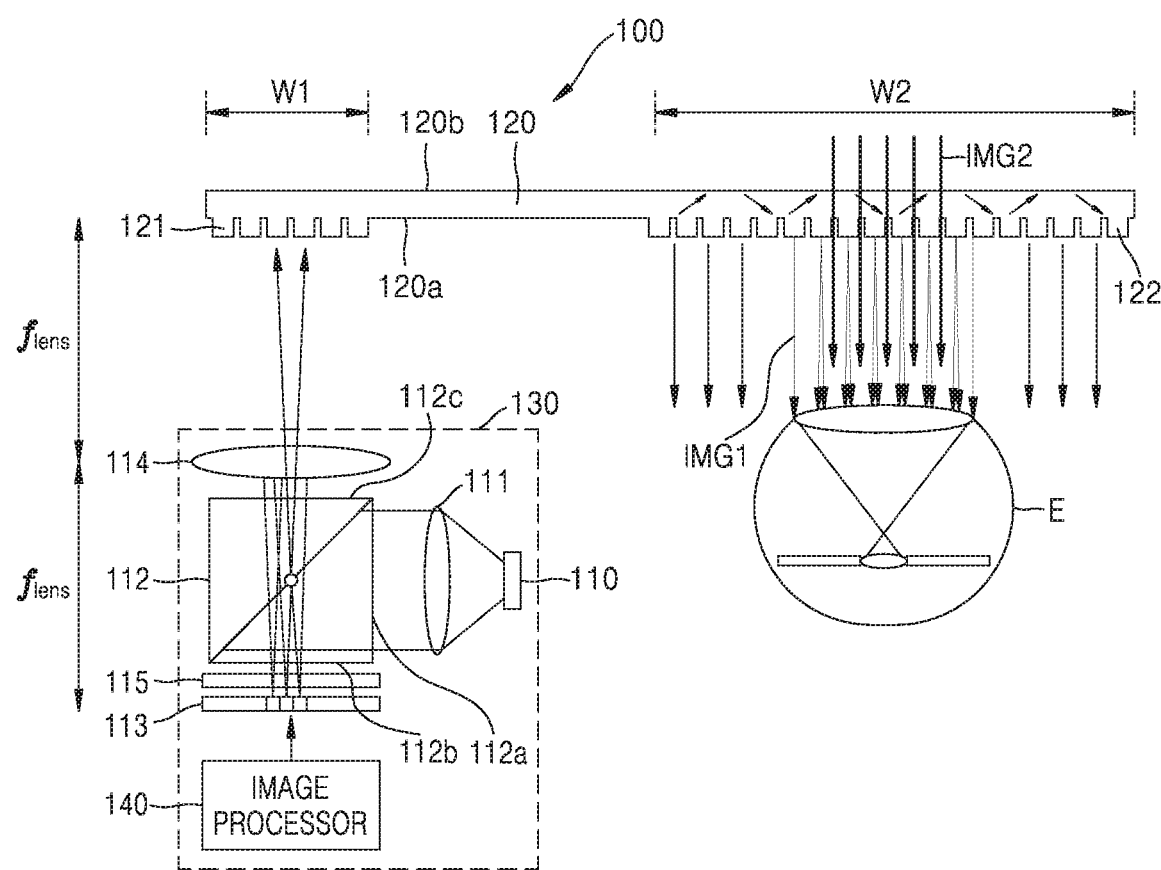
FIG. 1 is a view schematically illustrating a structure of a holographic display apparatus according to an example embodiment.

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, holographic display apparatuses and holographic display methods for providing expanded viewing windows will be described with reference to the accompanying drawings. In the drawings, and the sizes of elements may be exaggerated for clarity of illustration. Example embodiments described herein are for illustrative purposes only, and various modifications may be made therefrom. In the following description, when an element is referred to as being "above" or "on" another element in a layered structure, it may be directly on an upper, lower, left, or right side of the other element while making contact with the other element or may be above an upper, lower, left, or right side of the other element without making contact with the other element.

FIG. 1 is a view schematically illustrating a structure of a holographic display apparatus 100 according to an example embodiment. The holographic display apparatus 100 of the example embodiment may include a holographic image generator 130 configured to generate 3D holographic images, and a light guide plate 120 configured to deliver the 3D holographic images generated by the holographic image generator 130 to an eye E of a viewer.

The light guide plate 120 may include a material transparent to visible light such that the light guide plate 120 may be configured to transmit light as a waveguide. For example, the light guide plate 120 may include a material such as glass, poly methyl methacrylate (PMMA), or polydimethylsiloxane (PDMS). In addition, the light guide plate 120 may have a flat and even plate shape. The light guide plate 120 may include a first surface 120a and a second surface 120b, which is opposite the first surface 120a. An input coupler 121 configured to guide incident light obliquely to the inside of the light guide plate 120 and an output coupler 122 configured to output light propagating obliquely in the light guide plate 120 to the outside of the light guide plate 120 may be arranged on the first surface 120a of the light guide plate 120. For example, the input coupler 121 may be arranged on an edge portion of the first surface 120a of the light guide plate 120, and the output coupler 122 may be arranged on another edge portion of the first surface 120a of the light guide plate 120.

The input coupler 121 is configured such that light incident on the input coupler 121 in a direction substantially orthogonal to the input coupler 121 may be obliquely guided to the inside of the light guide plate 120. For example, the input coupler 121 may be configured such that light incident on the input coupler 121 within a predetermined incident angle range with respect to a direction orthogonal to the surface of the input coupler 121 may be guided to the inside of the light guide plate 120. Light guided into the light guide plate 120 may propagate along the inside of the light guide plate 120 while being repeatedly totally reflected by the first surface 120a and the second surface 120b of the light guide plate 120. The output coupler 122 is configured such that light obliquely incident on the output coupler 122 may be output to the outside of the light guide plate 120 in a direction substantially orthogonal to the light guide plate 120. The output coupler 122 may be configured to change only light which is obliquely incident on the surface of the output coupler 122 within a predetermined incident angle range and not to change light which is perpendicularly incident on the surface of the output coupler 122. The output coupler 122 may operate as a transparent plate for light incident perpendicularly on the surface of the output coupler 122.

Each of the input coupler 121 and the output coupler 122 may include a diffractive optical element (DOE) or a holographic optical element (HOE). The DOE may include a plurality of periodic fine grating patterns. The grating patterns of the DOE act as a diffraction grating to diffract incident light. In particular, according to the size, height, period, etc. of the grating patterns, light incident at a predetermined angle range may be diffracted and subjected to destructive interference and constructive interference, and thus, the propagation direction of the light may be changed. In addition, the HOE includes periodic fine patterns of materials having different refractive indexes. The HOE may similarly operate as the DOE, and may diffract incident light.

In the light guide plate 120, light incident on the input coupler 121 exits the light guide plate 120 through the output coupler 122. In addition, the directivity of light which is incident on the input coupler 121 and output through the output coupler 122 may be maintained within a coupling angle range of the input coupler 121. Therefore, the light guide plate 120 may deliver holographic images generated by the holographic image generator 130 to the eye E of the viewer.

The holographic image generator 130 may include a light source 110 configured to emit light, a spatial light modulator 113 configured to generate a holographic image by modulating light emitted from the light source 110, a beam splitter 112 configured to reflect light emitted from the light source 110 to the spatial light modulator 113 and transmit light reflected from the spatial light modulator 113, and a lens 114 configured to focus a holographic image reproduced by the spatial light modulator 113 on the input coupler 121 of the light guide plate 120. In addition, the holographic image generator 130 may further include a collimating lens 111 arranged between the light source 110 and the beam splitter 112. The collimating lens 111 may be configured to collimate divergent light emitted from the light source 110 as parallel light. However, when the light source 110 is configured to emit collimated light, the collimating lens 111 may be omitted. In addition, the holographic image generator 130 may further include an image processor 140 configured to control the operation of the spatial light modulator 113 and provide an image signal to the spatial light modulator 113.

The light source 110 may be a coherent light source configured to emit coherent light such that coherent light incident on the spatial light modulator 113 may be diffracted and subjected to interference. To provide light having high coherence, for example, a laser diode (LD) may be used as the light source 110. In addition, the light source 110 may be a light emitting diode (LED). The LED has lower spatial coherence than lasers, but light having only some spatial coherence may be sufficiently diffracted and modulated by the spatial light modulator 113. In addition to the LED, any other light source capable of emitting light having spatial coherence may be used as the light source 110.

The spatial light modulator 113 may display a hologram pattern according to a hologram data signal such as a computer generated hologram (CGH) signal provided from the image processor 140. After light emitted from the light source 110 and incident on the spatial light modulator 113 is diffracted by the hologram pattern displayed on a screen of the spatial light modulator 113, a holographic image having a three-dimensional effect may be reproduced by destructive interference and constructive interference. The spatial light modulator 113 may use any one of a phase modulator capable of performing only phase modulation, an amplitude modulator capable of performing only amplitude modulation, and a complex modulator capable of performing both phase modulation and amplitude modulation. In the example embodiment illustrated in FIG. 1, the spatial light modulator 113 may be a reflective spatial light modulator configured to diffract and modulate incident light while reflecting the incident light. For example, the spatial light modulator 113 may use a liquid crystal on silicon (LCoS) device, a digital micromirror device (DMD), or a semiconductor modulator.

The image processor 140 generates a CGH signal, based on source image data including information on a holographic image to be reproduced, and provides the generated CGH signal to the spatial light modulator 113. For example, the image processor 140 may generate a CGH signal by performing a Fourier transform (FT), a fast Fourier transform (FFT), an inverse Fourier transform (IFT), an inverse fast Fourier transform (IFFT) on the source image data. In addition, the image processor 140 may be configured to convert source image data and generate a CGH signal based on the converted source image data to improve the quality of a holographic image incident on the eye E of the viewer through the output coupler 122 of the light guide plate 120. This will be described later.

The beam splitter 112 is configured to reflect light incident from the light source 110 to the spatial light modulator 113 and transmit light incident from the spatial light modulator 113 to the lens 114. To this end, the beam splitter 112 is arranged in an optical path between the spatial light modulator 113 and the lens 114, and the light source 110 may be arranged on a side of the beam splitter 112. For example, the light source 110 may be arranged to face a first surface 112a of the beam splitter 112, the spatial light modulator 113 may be arranged to face a second surface 112b of the beam splitter 112, which is adjacent to the first surface 112a of the beam splitter 112, and the lens 114 may be arranged to face a third surface 112c of the beam splitter 112, which is opposite the second surface 112b of the beam splitter 112.

The beam splitter 112 may be, for example, a half mirror that simply reflects half of incident light and transmits the other half of the incident light. The beam splitter 112 may be a polarization beam splitter having polarization selectivity. For example, the beam splitter 112 may be configured to reflect light having a first linear polarization component and transmit light having a second linear polarization component, which is orthogonal to the first linear polarization component. In this case, among light emitted from the light source 110, light having the first linear polarization component is reflected by the beam splitter 112 to the spatial light modulator 113, and light having the second linear polarization component passes through the beam splitter 112 and is not used. In addition, the light source 110 may be a polarization laser which emits only light having the first linear polarization component. In this case, all of the light emitted from the light source 110 may be reflected and incident on the spatial light modulator 113.

A quarter-wave plate 115 may be further arranged between the beam splitter 112 and the spatial light modulator 113. The quarter-wave plate 115 may be configured to delay incident light by the quarter wavelength of the incident light. Therefore, light having the first linear polarization component and reflected by the beam splitter 112 may have a first circular polarization component while passing through the quarter-wave plate 115. Thereafter, while the light is reflected by the spatial light modulator 113 in a direction opposite the incident direction of the light, the light ends up having a second circular polarization component. The light having the second circular polarization component may have the second linear polarization component while passing through the quarter-wave plate 115, and thus passes through the beam splitter 112. The quarter-wave plate 115 may be integrally coupled to a surface of the spatial light modulator 113. In this case, the holographic image generator 130 may not include a separate quarter-wave plate 115.

The lens 114 may be configured to focus a holographic image and providing the holographic image to the input coupler 121 of the light guide plate 120. The distance between the lens 114 and the input coupler 121 may be equal to the focal length of the lens 114, but is not limited thereto. When the distance between the lens 114 and the input coupler 121 is equal to the focal length of the lens 114, light diffracted by the spatial light modulator 113 to various angles and thus containing a holographic image may be maximally coupled by the input coupler 121. The distance between the lens 114 and the spatial light modulator 113 may also be equal to the focal length of the lens 114, but is not limited thereto. When the distance between the lens 114 and the spatial light modulator 113 is equal to the focal length of the lens 114, a holographic image reproduced on the same plane as the spatial light modulator 113 may be delivered to the eye E of the viewer without image quality deterioration.

A holographic image modulated and reproduced by the spatial light modulator 113 may pass through the lens 114 and may be provided to the eye E of the viewer through the input coupler 121 of the light guide plate 120, the interior of the light guide plate 120, and the output coupler 122 of the light guide plate 120. Since light output through the output coupler 122 without change has the direction component of light incident on the input coupler 121, a holographic image may be seen by the eye E of the viewer. In particular, according to the example embodiment, since the width W2 of the output coupler 122 is greater than the width W1 of the input coupler 121, a viewing window through which a viewer views holographic images may be expanded. For example, as shown in FIG. 1, the eye E of the viewer does not need to be fixed at a particular point, and when the eye E of the viewer is located within the range of the width W2 of the output coupler 122, it is sufficient for the viewer to view holographic images.

In addition, since the output coupler 122 acts as a diffraction grating only for light incident obliquely to the surface of the output coupler 122 and transmits light incident perpendicularly to the surface of the output coupler 122, the holographic display apparatus 100 of the example embodiment may be used to realize augmented reality (AR) or mixed reality (MR). In this case, the holographic display apparatus 100 of the example embodiment may be a near-eye AR display apparatus. For example, a holographic image IMG1 which is reproduced by the spatial light modulator 113 and an external image IMG2 which contains an external foreground and perpendicularly passes through the output coupler 122 may be seen together by the eye E of the viewer.

Figure 2:
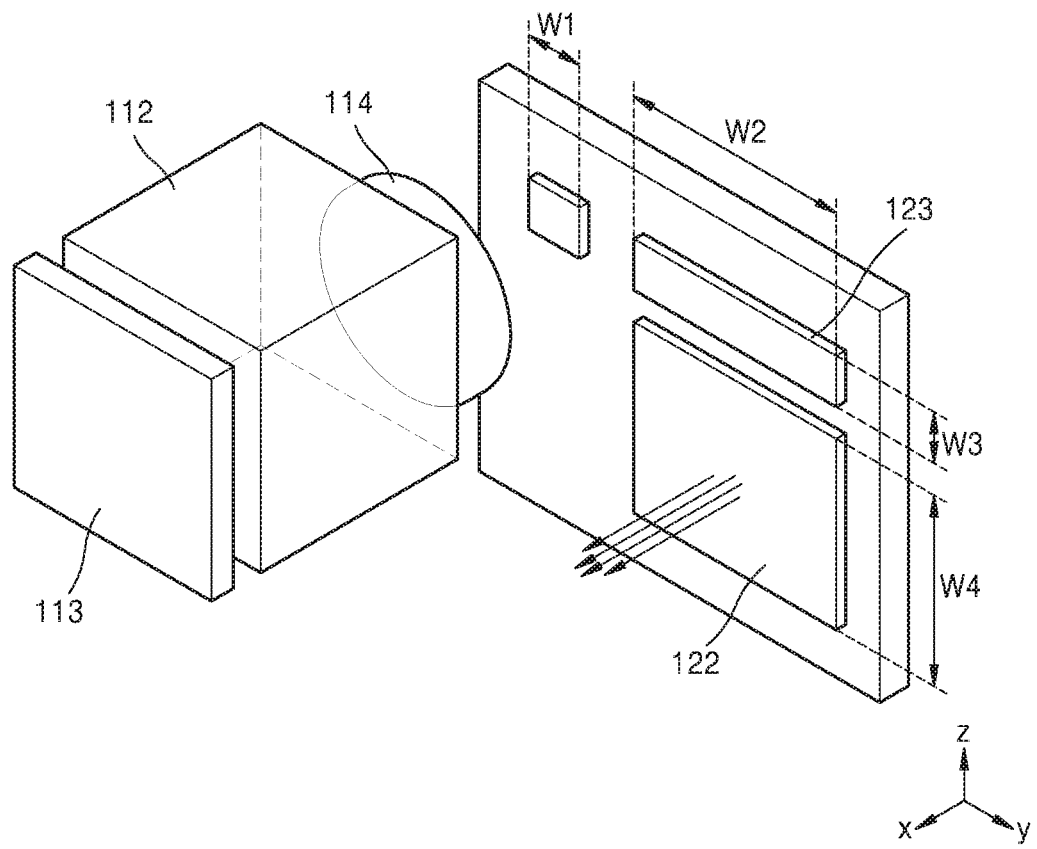
FIG. 2 is a perspective view schematically illustrating a structure of a light guide plate of the holographic display apparatus according to an example embodiment.

FIG. 2 is a perspective view schematically illustrating a structure of the light guide plate 120 of the holographic display apparatus 100 according to an example embodiment. Referring to FIG. 2, the light guide plate 120 may further include an intermediate coupler 123 arranged in an optical path between the input coupler 121 and the output coupler 122. The intermediate coupler 123 is arranged in a +y direction with respect to the input coupler 121, and the output coupler 122 is arranged in a −z direction with respect to the intermediate coupler 123. In this case, the input coupler 121 may be configured to allow light incident on the input coupler 121 to propagate in the +y direction inside the light guide plate 120. In addition, the intermediate coupler 123 may be configured to allow light incident on the intermediate coupler 123 to propagate in the light guide plate 120 in the −z direction orthogonal to the +y direction inside the light guide plate 120. Therefore, the propagation direction of light in the light guide plate 120 is bent by about 90 degrees by the intermediate coupler 123. The output coupler 122 may be configured to output light incident on the output coupler 122 to the outside of the light guide plate 120 in a +x direction orthogonal to the +y direction and the −z direction.

The intermediate coupler 123 may expand the viewing window in the +y direction. To this end, the width W2 of the intermediate coupler 123 in the +y direction may be greater than the width W1 of the input coupler 121 in the +y direction. The width W3 of the intermediate coupler 123 in the −z direction is the same as the width W3 of the input coupler 121 in the −z direction. The output coupler 122 expands the viewing window in the −z direction. To this end, the width W4 of the output coupler 122 in the −z direction may be greater than the width W3 of the intermediate coupler 123 in the −z direction. In addition, the width W2 of the output coupler 122 in the +y direction may be the same as the width W2 of the intermediate coupler 123 in the +y direction. Therefore, the viewing window may be expanded in both the +y direction and the −z direction that are orthogonal to each other, and thus the area of the viewing window may be increased.

Figure 3:
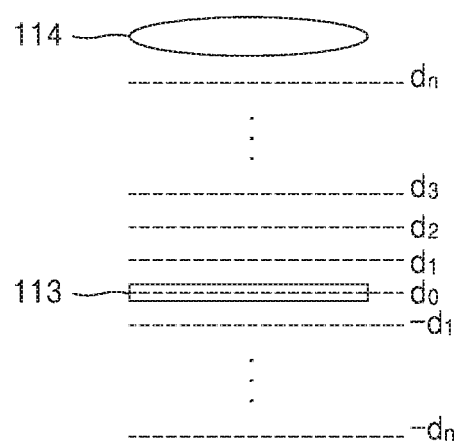
FIG. 3 is an example view illustrating depths of a holographic image generated by a holographic image generator.

In addition, since a three-dimensional holographic image generated by the holographic image generator 130 has various depths, the viewer may have a three-dimensional impression. For example, FIG. 3 is an example view illustrating depths of a holographic image generated by the holographic image generator 130. Referring to FIG. 3, the holographic image may have various depths −dn, . . . , −d1, d0, d1, d2, d3, . . . , dn with respect to the plane of the spatial light modulator 113. The depths of the holographic image may be determined by a diffraction pattern which is displayed by the spatial light modulator 113 based on a CGH signal provided from the image processor 140.

However, when the distance between the spatial light modulator 113 and the eye E of the viewer is increased because of the light guide plate 120 arranged between the spatial light modulator 113 and the eye E of the viewer, the quality of the holographic image may deteriorate because the extent to which light points are spread varies with depths. In addition, additional image deterioration may occur due to repetitive reflection in the light guide plate 120 and diffraction at the input coupler 121 and the output coupler 122. For example, when the spatial light modulator 113 is located at the focal length of the lens 114, an image located at the same depth d0 as the plane of the spatial light modulator 113 may be delivered to the eye E of the viewer substantially without image quality deterioration. However, as the distance of the image from the spatial light modulator 113 increases, the degree of light diffusion may increase, and thus, image quality deterioration may increase.

Figure 4A:
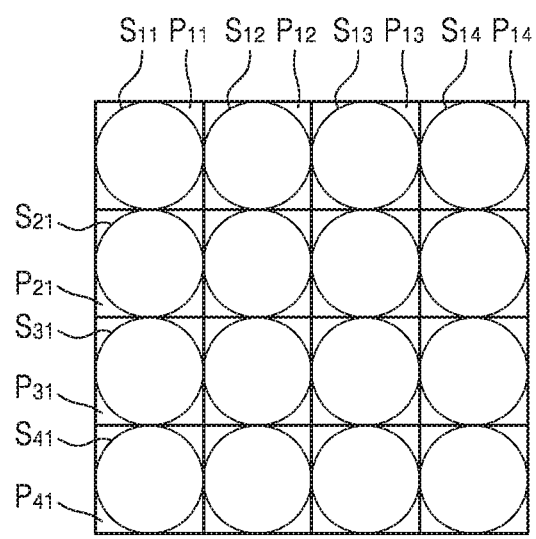
FIGS. 4A and 4B are example views illustrating the degree of a blur per pixel according to the depth of a holographic image in an image plane, the holographic image being output through an output coupler.
Figure 4B:
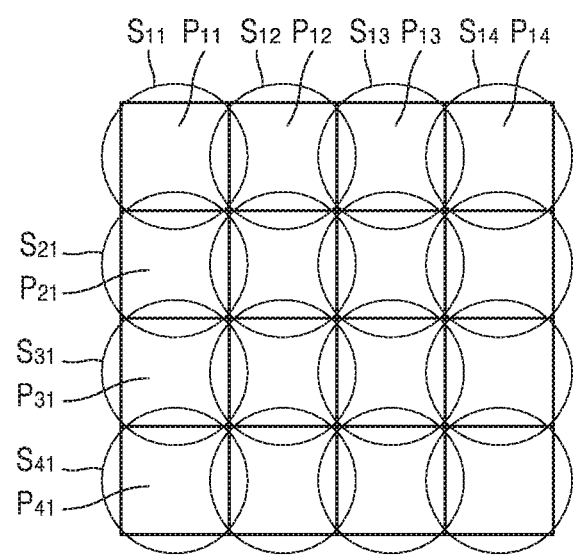

For example, FIGS. 4A and 4B are example views illustrating the degree of a blur per pixel according to the depth of a holographic image on an image plane, the holographic image being output through the output coupler 122. Here, for example, the image plane may be the retina of the eye E of the viewer. First, FIG. 4A shows a state in which a two-dimensional image having the same depth d0 as the plane of the spatial light modulator 113 is delivered to the retina of the eye E of the viewer. In FIG. 4A, $P_{11}$, $P_{12}$, $P_{13}$, $P_{14}$, $P_{21}$, $P_{31}$, and $P_{41}$ refer to a two-dimensional array of pixels of a target holographic image at the depth d0. In addition, $S_{11}$, $S_{12}$, $S_{13}$, $S_{14}$, $S_{21}$, $S_{31}$, and $S_{41}$ refer to spots of light actually transmitted to the retina of the eye E of the viewer through the lens 114 and the light guide plate 120. Referring to FIG. 4A, when the image is located at the same depth d0 as the plane of the spatial light modulator 113, the light spots $S_{11}$, $S_{12}$, $S_{13}$, $S_{14}$, $S_{21}$, $S_{31}$, and $S_{41}$ transmitted to the retina of the eye E of the viewer coincide with the pixels $P_{11}$, $P_{12}$, $P_{13}$, $P_{14}$, $P_{21}$, $P_{31}$, and $P_{41}$ of the target holographic image. Therefore, when the spatial light modulator 113 is positioned at the focal length of the lens 114, an image located at the same depth d0 as the plane of the spatial light modulator 113 may be delivered to the retina of the eye E of the viewer without image quality deterioration.

In addition, FIG. 4B shows a state in which a two-dimensional image having a depth d1 different from the plane of the spatial light modulator 113 is delivered to the retina of the eye E of the viewer. Referring to FIG. 4B, in the case of images having depths −dn, . . . , −d1, d1, d2, d3, . . . , dn different from the plane of the spatial light modulator 113, light spots $S_{11}$, $S_{12}$, $S_{13}$, $S_{14}$, $S_{21}$, $S_{31}$, and $S_{41}$ transmitted to the retina of the eye E of the viewer are larger than the pixels $P_{11}$, $P_{12}$, $P_{13}$, $P_{14}$, $P_{21}$, $P_{31}$, and $P_{41}$ of a target holographic image because of spreading of the spots $S_{11}$, $S_{12}$, $S_{13}$, $S_{14}$, $S_{21}$, $S_{31}$, and $S_{41}$. Thus, the spots $S_{11}$, $S_{12}$, $S_{13}$, $S_{14}$, $S_{21}$, $S_{31}$, and $S_{41}$ overlap each other in the pixels $P_{11}$, $P_{12}$, $P_{13}$, $P_{14}$, $P_{21}$, $P_{31}$, and $P_{41}$, that is, a plurality of adjacent spots overlap each other in one pixel. Therefore, when the spatial light modulator 113 is located at the focal length of the lens 114, the quality of images located at depths −dn, . . . , −d1, d1, d2, d3, . . . , dn may decrease while the images are transmitted to the retina of the eye E of the viewer. In addition, as the depth of a holographic image is distant from the focal length of the lens 114, light spots $S_{11}$, $S_{12}$, $S_{13}$, $S_{14}$, $S_{21}$, $S_{31}$, and $S_{41}$ transmitted to the retina of the eye E of the viewer are more greatly spread. Moreover, the degree of spread of these spots $S_{11}$, $S_{12}$, $S_{13}$, $S_{14}$, $S_{21}$, $S_{31}$, and $S_{41}$ may vary even at the same depth according to the two-dimensional positions of the spots $S_{11}$, $S_{12}$, $S_{13}$, $S_{14}$, $S_{21}$, $S_{31}$, and $S_{41}$.

Thus, the blur of a holographic image output through the output coupler 122 may be compensated for by considering the degree of spread of spots $S_{11}$, $S_{12}$, $S_{13}$, $S_{14}$, $S_{21}$, $S_{31}$, and $S_{41}$ according to the depth of the holographic image and the two-dimensional positions of the spots $S_{11}$, $S_{12}$, $S_{13}$, $S_{14}$, $S_{21}$, $S_{31}$, and $S_{41}$. A point spread function may be calculated according to the depths and pixels of a holographic image transmitted to the retina of the eye E of the viewer, and source image data may be converted based on the calculated point spread function to compensate for the blur of the holographic image transmitted to the retina of the eye E of the viewer and thus to more clearly provide the holographic image to the viewer.

Figure 5:
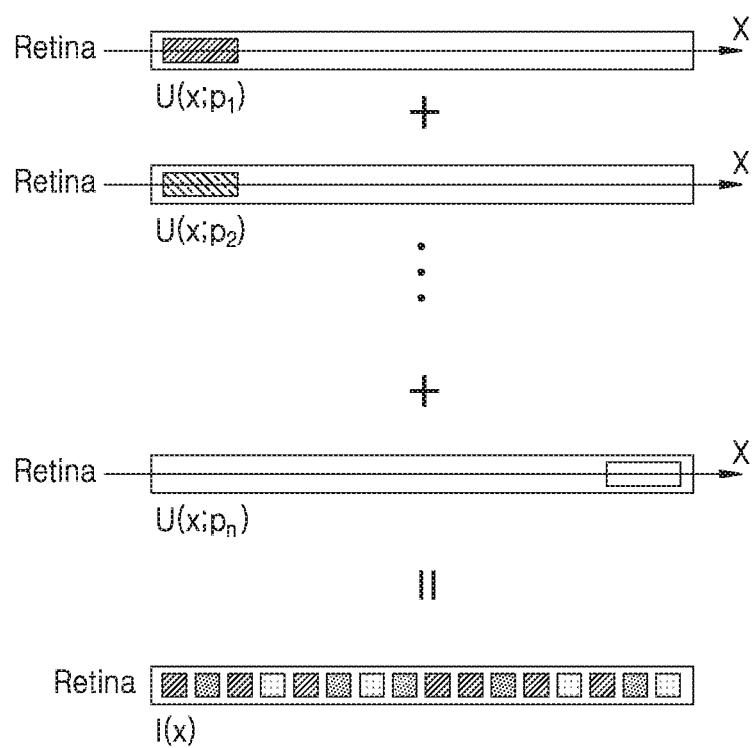
FIG. 5 is a view conceptually illustrating the principle of compensating for a blur of a holographic image output through the output coupler.

For example, FIG. 5 conceptually illustrates the principle of compensating for a blur of a holographic image output through the output coupler 122. Referring to FIG. 5, all of light spots $p_1$, $p_2$, . . . , $p_n$ transmitted to the retina of the eye E of the viewer in the x direction are added together. Then, source image data may be converted such that the result of the addition may be minimally different from a target holographic image I(x) at the retina of the eye E of the viewer. Although only one-dimensional calculation is illustrated in FIG. 5 as an example, two-dimensional calculation is actually performed. For example, all light spots transmitted to the retina of the eye E of the viewer in the x and y directions may be added together, and source image data may be converted such that the result of the addition may be minimally different from a target holographic image I(x,y) at the retina of the eye E of the viewer. In addition, the above-described process may be performed individually for all depths. Then, the quality of a holographic image formed on the retina of the eye E of the viewer may be improved regardless of depths. All of these processes may be performed by the image processor 140.

Figure 6:
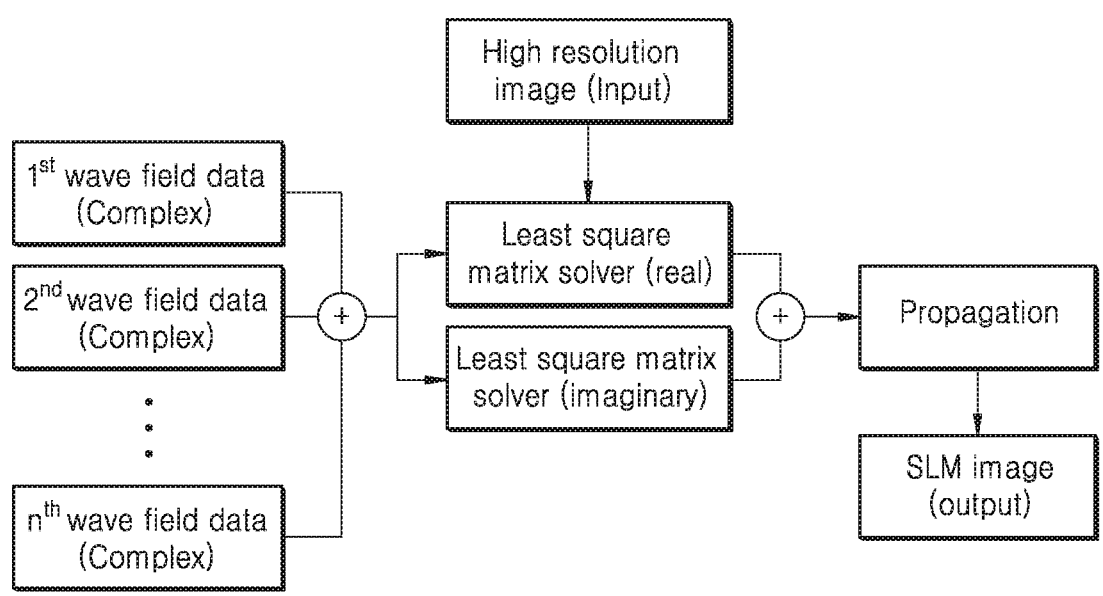
FIG. 6 is a block diagram schematically illustrating a mathematical algorithm for compensating for a blur of a holographic image output through the output coupler.

In addition, FIG. 6 is a block diagram schematically illustrating a mathematical algorithm for compensating for a blur of a holographic image output through the output coupler 122. Referring to FIG. 6, light which forms a holographic image at one depth and is generated by the spatial light modulator 113 may be mathematically expressed by a plurality of complex wave fields having a complex number form which contains both phase information and intensity information. Then, a point spread function may be applied to the plurality of complex wave fields to calculate complex wave fields to be transmitted to the retina of the eye E of the viewer. Thereafter, complex pixel values of a holographic image formed on the retina of the eye E of the viewer may be obtained for each pixel by summing calculated complex wave field data.

After summing the calculated complex wave field data, the real part and imaginary part of the complex pixel value of each pixel of the holographic image formed on the retina of the eye E of the viewer may be compared with the real part information and the imaginary part information of a target holographic image to be reproduced. Thereafter, based on results of the comparison, complex wave fields of an optimized holographic image to be generated by the spatial light modulator 113 may be calculated in such a manner that a holographic image actually formed on the retina of the eye E of the viewer may minimally differ from the target holographic image. The image processor 140 may convert source image data based on the complex wave fields of the optimized holographic image, calculate a CGH signal using the converted source image data, and provide the CGH signal to the spatial light modulator 113.

In addition, when the optical characteristics of the lens 114, the light guide plate 120, the input coupler 121, and the output coupler 122 are fixed, the degree of spread of light transmitted to the retina of the eye E of the viewer is constant per depth and pixel. Therefore, there is a constant relationship at each depth and pixel between source image data converted for image quality improvements and original source image data. When the relationship is calculated and stored in advance, the image processor 140 may convert original source image data using the previously calculated and stored relationship without having to perform complicated calculations each time.

Figure 7:
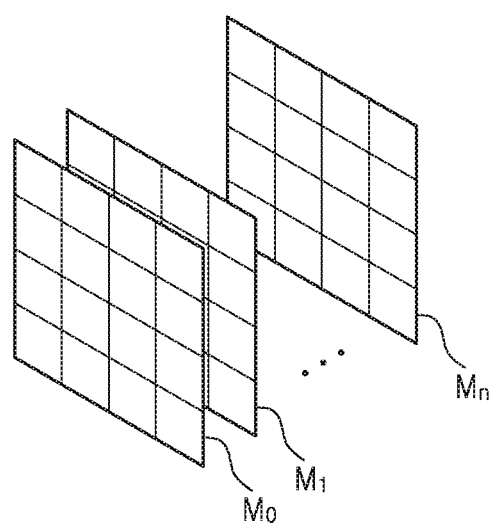
FIG. 7 is an example view illustrating a plurality of two-dimensional matrices that are previously calculated on a depth basis to modify source image data based on a blur of a holographic image output through the output coupler.

This relationship between source image data converted for image quality improvements and original source image data may be stored in the form of a two-dimensional matrix previously calculated for each depth. For example, FIG. 7 is an example view illustrating a plurality of two-dimensional matrices that are previously calculated on a depth basis to modify source image data based on a blur of a holographic image output through the output coupler 122. Referring to FIG. 7, each of a plurality of two-dimensional matrices M1, M2, . . . , Mn may be precalculated and stored to convert original source image data having a depth corresponding thereto. Each of the two-dimensional matrices M1, M2, . . . , Mn has conversion information precalculated for each pixel. The two-dimensional matrices M1, M2, . . . , Mn may be stored in a memory of the image processor 140, and the image processor 140 may convert original source data by referring to the two-dimensional matrices M1, M2, . . . , Mn and may generate a CGH using the converted source image data. For example, the image processor 140 may convert first source image data having first depth information on the basis of the first matrix M1, and second source image data having second depth information on the basis of the second matrix M2.

The two-dimensional matrices M1, M2, . . . , Mn may be obtained in the manner described with reference to FIGS. 5 and 6. For example, a test holographic image to be reproduced on an image plane, for example, the eye E of the viewer, may be estimated by calculating a point spread function for each depth and pixel on the basis of a plurality of pieces of original test source image data having a plurality of pieces of depth information. In addition, the test holographic image estimated for each depth may be compared with a target holographic image for each depth, and test source image data for minimizing the difference to be below a certain value between the test holographic image and the target holographic image may be calculated for each depth. For example, a test holographic image estimated for a first depth and a target holographic image for the first depth may be compared with each other to calculate first test source image data, which is corrected for the first depth to minimize the difference between the test holographic image and the target holographic image to be below a certain value. In addition, a test holographic image estimated for a second depth and a target holographic image for the second depth may be compared with each other to calculate second test source image data, which is corrected for the second depth to minimize the difference between the test holographic image and the target holographic image to be below a certain value.

Then, original test source image data for each depth may be compared with test source image data corrected for each depth to calculate a plurality of two-dimensional matrices M1, M2, . . . , Mn for converting original test source image data for each depth into corrected test source image data for each depth. For example, the first matrix M1 for converting the original test source image data for the first depth into the corrected test source image data for the first depth may be calculated, and the second matrix M2 for converting the original test source image data for the second depth into the corrected test source image data for the second depth may be calculated According to the example embodiments described above, since a CGH signal optimized for compensating for a blur of a holographic image output through the output coupler 122 is calculated and provided to the spatial light modulator 113, it may be possible to expand a viewing window and improve the quality of the holographic image as well.

Figure 8:
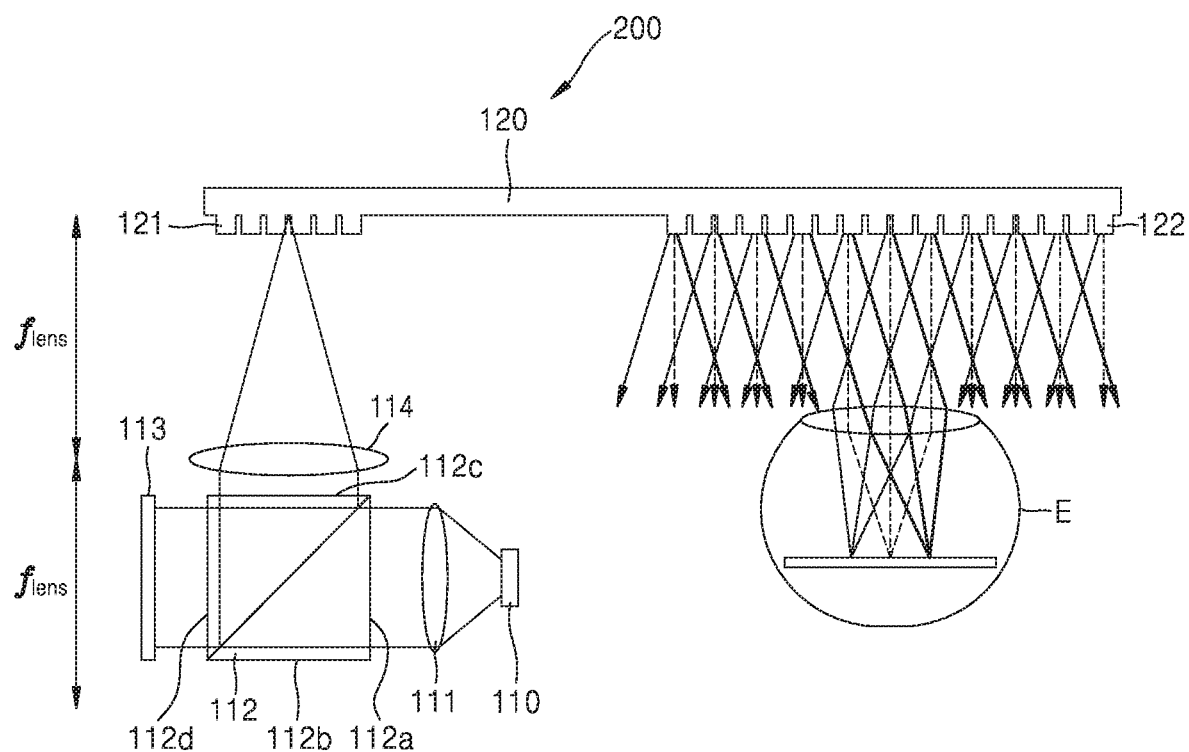
FIG. 8 is a view schematically illustrating a structure of a holographic display apparatus according to another example embodiment.

FIG. 8 is a view schematically illustrating a structure of a holographic display apparatus 200 according to another example embodiment. In the holographic display apparatus 200 illustrated in FIG. 8, a beam splitter 112 may be configured to transmit light emitted from a light source 110 and reflect light reflected from a spatial light modulator 113. To this end, the light source 110 may be arranged to face a first surface 112a of the beam splitter 112, and the spatial light modulator 113 may be arranged to face a fourth surface 112d of the beam splitter 112, which is opposite the first surface 112a of the beam splitter 112. The beam splitter 112 may be configured to reflect light having a first linear polarization component and transmit light having a second linear polarization component, which is orthogonal to the first linear polarization component. The light source 110 may be a polarization laser which emits only light having the first linear polarization component. The structure of the holographic display apparatus 200 may be the same as the structure of the holographic display apparatus 100 illustrated in FIG. 1 except for the arrangement position of the spatial light modulator 113.

Figure 9:
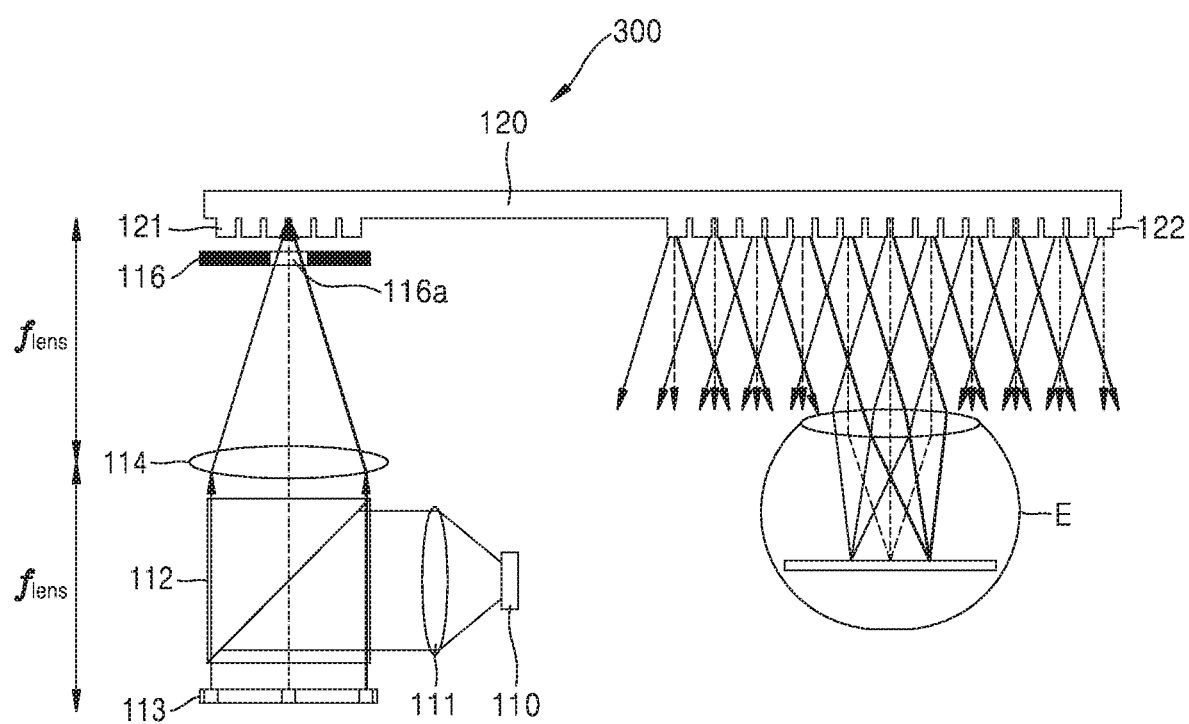
FIG. 9 is a view schematically illustrating a structure of a holographic display apparatus according to another example embodiment.

FIG. 9 is a view schematically illustrating a structure of a holographic display apparatus 300 according to another example embodiment. Referring to FIG. 9, the holographic display apparatus 300 may further include a spatial filter 116 arranged to face an input coupler 121 of a light guide plate 120 and configured to limit light incident to the input coupler 121. The structure of the holographic display apparatus 200 may be the same as the structure of the holographic display apparatus 100 illustrated in FIG. 1 except for the addition of the spatial filter 116.

The spatial filter 116 may be arranged between a lens 114 and the input coupler 121 at a position closer to the input coupler 121. The spatial filter 116 may have an opening 116a which is relatively small and through which light from the lens 114 passes. The spatial filter 116 may be arranged such that the center of the opening 116a may be on the optical axis of the lens 114. Since light passes through only the relatively small opening 116a of the spatial filter 116 and enters the input coupler 121, light having a large diffraction angle among light diffracted by the spatial light modulator 113 may be blocked by the spatial filter 116. Therefore, the spread of light which reaches the pupil of an eye E of a viewer through a light guide plate 120 may be more suppressed, and thus, holographic image quality may be improved.

When the spatial filter 116 is used, the depth information of a holographic image may be lost, and thus, the three-dimensional effect of the holographic image may decrease. Therefore, the spatial filter 116 may be used to display subtitles or the like of which the three-dimensional effect is not important. To this end, the spatial filter 116 may be configured to move along an optical path between the lens 114 and the input coupler 121 as needed. The spatial filter 116 may be configured in the form of a variable aperture stop of which diameter of the opening 116a is variable as needed.

Figure 10:
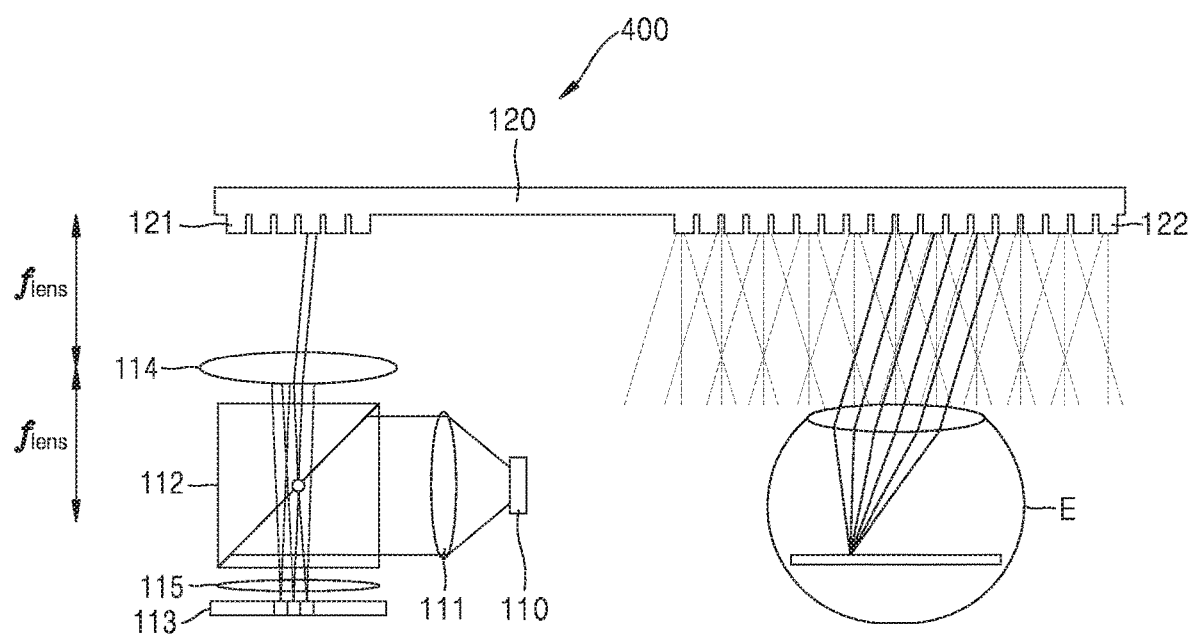
FIG. 10 is a view schematically illustrating a structure of a holographic display apparatus according to another example embodiment.

FIG. 10 is a view schematically illustrating a structure of a holographic display apparatus 400 according to another example embodiment. In the holographic display apparatus 400 illustrated in FIG. 10, the distance between a spatial light modulator 113 and a lens 114 is greater than the focal length of the lens 114. The structure of the holographic display apparatus 400 may be the same as the structure of the holographic display apparatus 100 shown in FIG. 1 except for the distance between the spatial light modulator 113 and the lens 114. When the distance between the spatial light modulator 113 and the lens 114 is greater than the focal length of the lens 114, a clear holographic image may be provided to a viewer without image quality deterioration by adjusting the depth of the holographic image reproduced by the spatial light modulator 113 to be at the focal length of the lens 114. In this case, the holographic image appears to the viewer as if the holographic image is located at an infinite distance.

In addition, the image quality improving method described with reference to FIGS. 5 to 7 may be applied to the holographic display apparatus 400 shown in FIG. 10. However, in the example embodiment shown in FIG. 10, since the plane of the spatial light modulator 113 does not coincide with the focal length of the lens 114, a reference depth which does not cause image quality deterioration is not coplanar with the spatial light modulator 113. Therefore, the relative depth between the plane of the spatial light modulator 113 and a holographic image reproduced by the spatial light modulator 113 is different from that in the example embodiment shown in FIG. 1.

Figure 11:
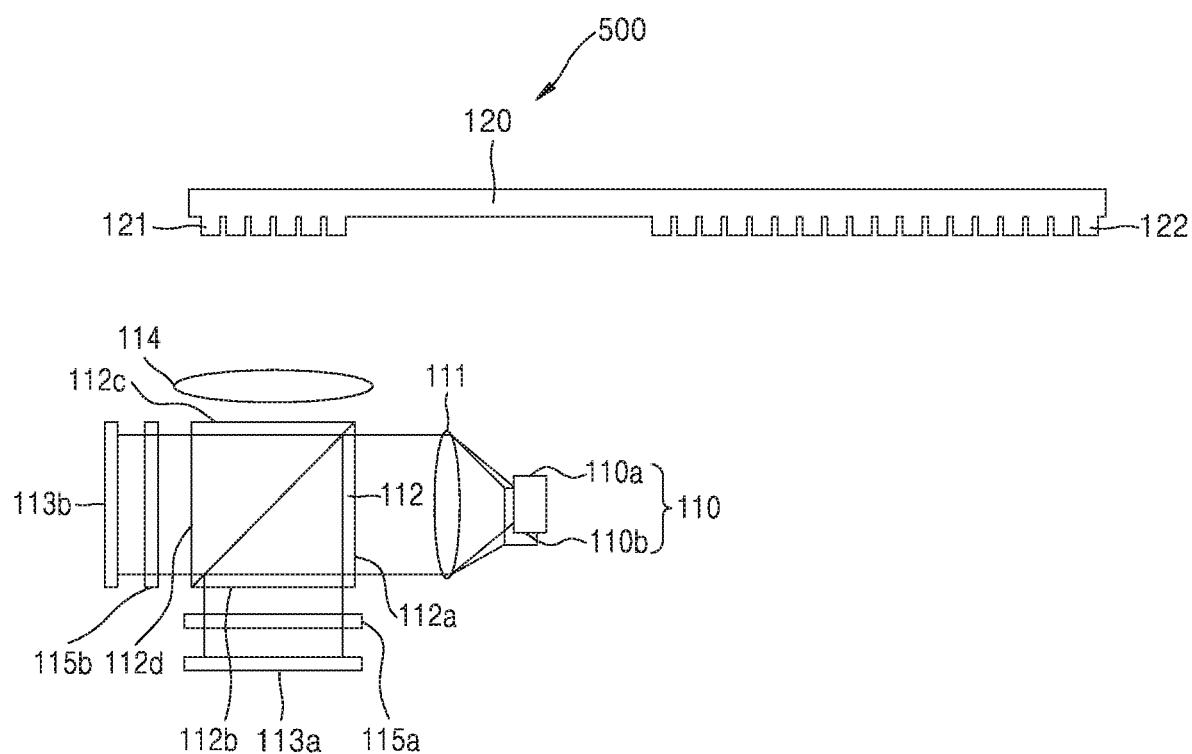
FIG. 11 is a view schematically illustrating a structure of a holographic display apparatus according to another example embodiment.

FIG. 11 is a view schematically illustrating a structure of a holographic display apparatus 500 according to another example embodiment. Referring to FIG. 11, the holographic display apparatus 500 according to the example embodiment may include two spatial light modulators, that is, first spatial light modulator 113a and a second spatial light modulator 113b. For example, the first spatial light modulator 113a may be arranged to face a second surface 112b of a beam splitter 112, and the second spatial light modulator 113b may be arranged to face a fourth surface 112d of the beam splitter 112 that is adjacent to the second surface 112b. The first and second spatial light modulators 113a and 113b may operate simultaneously or alternately in a time division manner as needed. When two spatial light modulators, for example, the first and second spatial light modulators 113a and 113b, are used, a holographic image having various depths, which is difficult to provide with only one spatial light modulator, may be provided, or independent separate images may be provided simultaneously or alternately in a time-division manner.

In addition, the holographic display apparatus 500 may further include a first quarter-wave plate 115a between the first spatial light modulator 113a and the beam splitter 112, and a second quarter-wave plate 115b between the second spatial light modulator 113b and the beam splitter 112. The first quarter-wave plate 115a and the second quarter-wave plate 115b may be integrally coupled to the surfaces of the first spatial light modulator 113a and the second spatial light modulator 113b, respectively. In this case, the first quarter-wave plate 115a and the second quarter-wave plate 115b may be omitted.

The beam splitter 112 may be configured to reflect light having a first linear polarization component and transmit light having a second linear polarization component orthogonal to the first linear polarization component. In this case, a light source 110 may be configured to emit light having all the polarization components. The light source 110 may include a first light source 110a configured to emit light having only the first linear polarization component and a second light source 110b configured to emit light having only the second linear polarization component.

Light emitted from the light source 110 and having the first linear polarization component is reflected by the beam splitter 112 and is then reflected and modulated by the first spatial light modulator 113a. Thereafter, the first linear polarization component is converted into the second linear polarization component as the first linear polarization component passes through the first quarter-wave plate 115a twice. Therefore, the light reflected and modulated by the first spatial light modulator 113a passes through the beam splitter 112 and enters the lens 114. In addition, light emitted from the light source 110 and having the second linear polarization component passes through the beam splitter 112 and is then reflected and modulated by the second spatial light modulator 113b. Thereafter, the second linear polarization component is converted into the first linear polarization component as the second linear polarization component passes through the second quarter-wave plate 115b twice. Therefore, the light reflected and modulated by the second spatial light modulator 113b is reflected by the beam splitter 112 and enters the lens 114.

Figure 12:
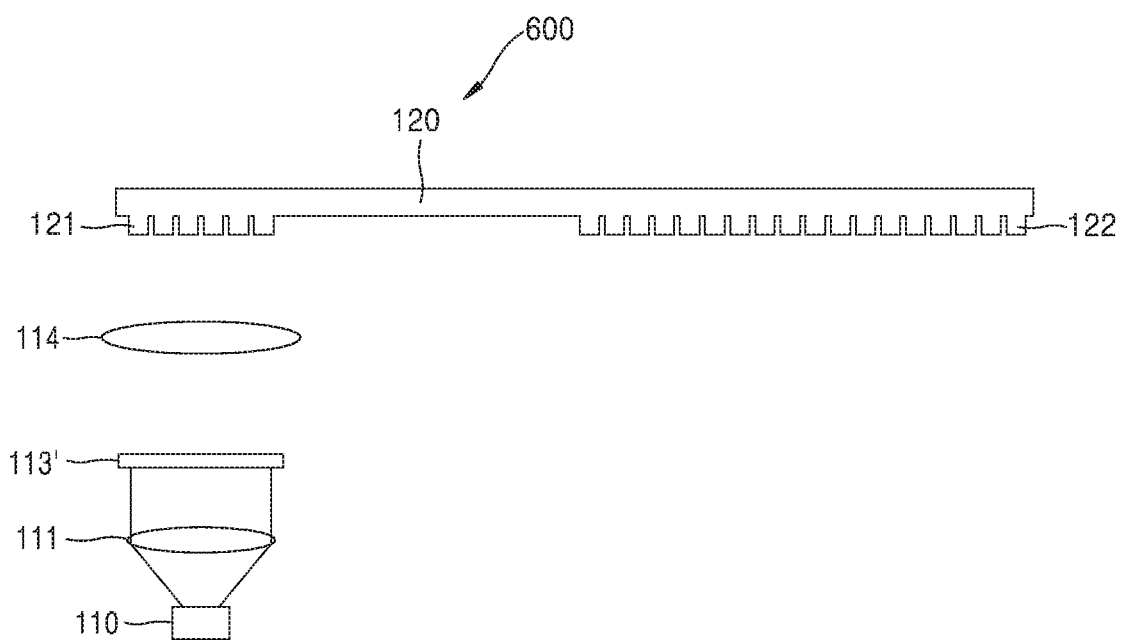
FIG. 12 is a view schematically illustrating a structure of a holographic display apparatus according to another example embodiment.

Although the spatial light modulators, that is, the spatial light modulator 113, the first spatial light modulator 113a, and the second spatial light modulator 113b, described above are of reflection type spatial light modulators, embodiments are not limited thereto. For example, the spatial light modulator 113, the first spatial light modulator 113a, and the second spatial light modulator 113b may be transmissive spatial light modulators configured to modulate light passing therethrough. For example, FIG. 12 is a diagram schematically illustrating a structure of a holographic display apparatus 600 according to another example embodiment. Referring to FIG. 12, the holographic display apparatus 600 may include a light guide plate 120 including an input coupler 121 and an output coupler 122, a light source 110, a collimating lens 111, a spatial light modulator 113', and a lens 114. The light source 110, the collimating lens 111, the spatial light modulator 113', and the lens 114 may be sequentially arranged in the propagation direction of light to face the input coupler 121 of the light guide plate 120. Here, the spatial light modulator 113' is a transmissive spatial light modulator configured to modulate light passing therethrough. For example, the spatial light modulator 113' may use a semiconductor modulator based on a compound semiconductor such as gallium arsenide (GaAs), or a liquid crystal device (LCD). When the transmissive spatial light modulator 113' is used, a beam splitter 112 may be omitted, and thus a more simple optical system may be provided.

Figure 13:
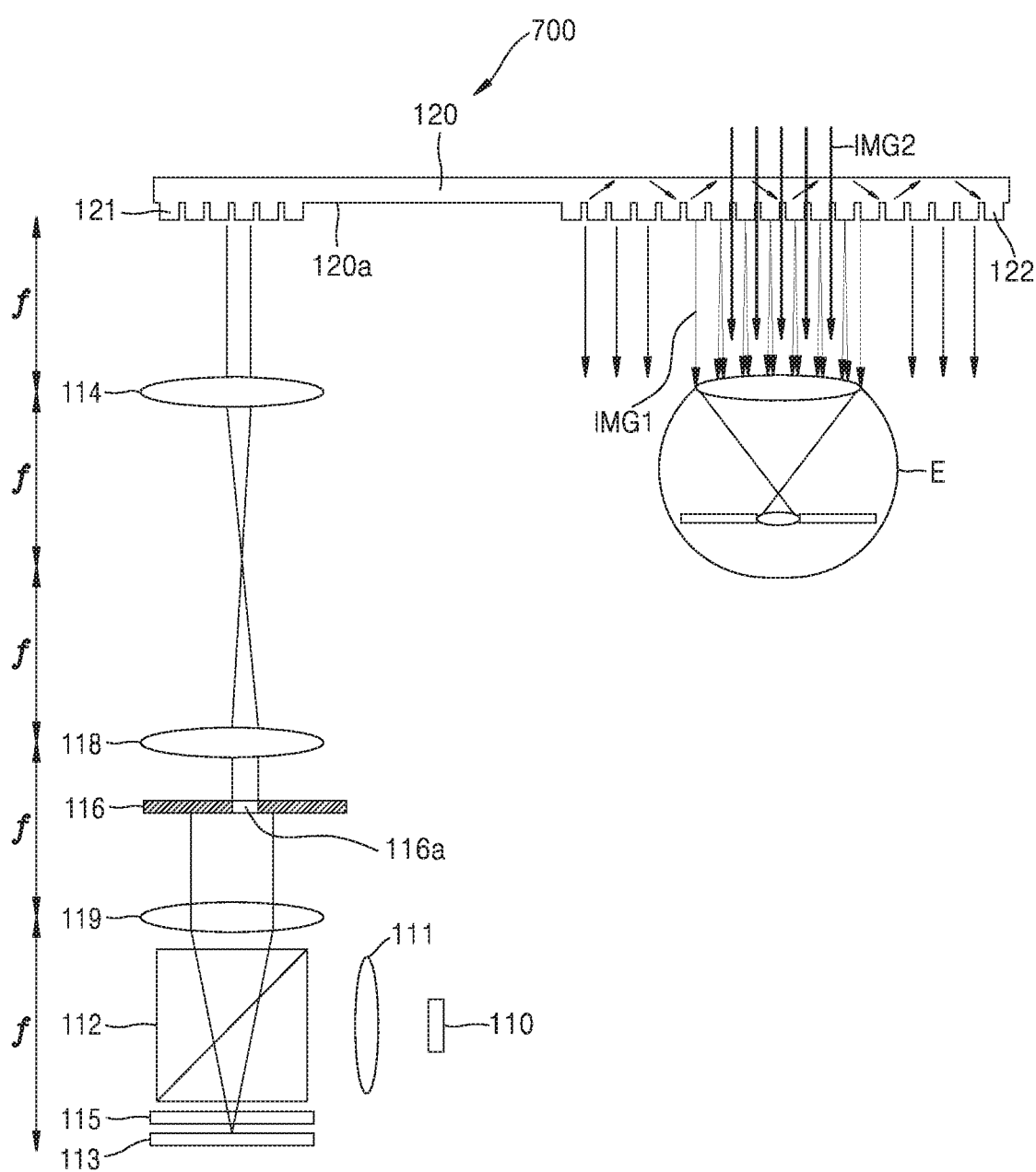
FIG. 13 is a view schematically illustrating a structure of a holographic display apparatus according to another embodiment.

In addition, FIG. 13 is a diagram schematically illustrating a structure of a holographic display apparatus 700 according to another example embodiment. Referring to FIG. 13, the holographic display apparatus 700 may further include two lenses 118 and 119 and a spatial filter 116 that are arranged in an optical path between a beam splitter 112 and a lens 114, compared to the holographic display apparatus 100 illustrated in FIG. 1. The two lenses 118 and 119 may have the same focal length, and the focal length of the two lenses 118 and 119 may be the same as or different from the focal length of the lens 114. The distance between the lens 119 and a spatial light modulator 113 is equal to the focal length of the lens 119, and the distance between the lens 119 and the lens 118 is equal to the focal length of the lenses 118 and 119. In addition, the distance between the lens 118 and the lens 114 is equal to the sum of the focal length of the lens 118 and the focal length of the lens 114. The distance between the lens 114 and an input coupler 121 is equal to the focal length of the lens 114.

The spatial filter 116 may be arranged in an optical path between the lens 118 and the lens 119. For example, the spatial filter 116 may be arranged at a middle position between the lens 118 and the lens 119. The lens 119 arranged between the spatial light modulator 113 and the spatial filter 116 projects light from one point of the spatial light modulator 113 onto the spatial filter 116. The spatial filter 116 removes undesired image noise and high order holographic images that are generated by the spatial light modulator 113 and transmits only desired holographic images. The lens 118 relays a holographic image passing through the spatial filter 116 to the lens 114, and the lens 114 arranged between the lens 118 and the input coupler 121 projects the holographic image transmitted from the lens 118 onto the input coupler 121.

In general, the spatial light modulator 113 includes an array of a plurality of two-dimensionally arranged pixels, and this physical pixel array of the spatial light modulator 113 serves as a diffraction grating to diffract light incident from the light source 110. Therefore, light incident from the light source 110 is diffracted not only by a hologram pattern displayed by the spatial light modulator 113 but also by a regular diffraction grating formed by the pixel array of the spatial light modulator 113. Light diffracted by the hologram pattern displayed on the spatial light modulator 113 forms a holographic image, while light diffracted by the pixel array of the spatial light modulator 113 forms regular lattice points. These regular lattice points become image noise which makes the viewing of holographic images uncomfortable. In addition, a holographic image includes a first order holographic image formed by light which is diffracted in first order by the hologram pattern displayed on the spatial light modulator 113 and a higher order holographic image formed by second or higher order diffracted light. In addition, there is noise generated by light which is not diffracted by the spatial light modulator 113. Holographic images may be reproduced by avoiding or reducing noises through an off-axis method so that the noises may not be visible to viewers.

According to the off-axial method, the spatial filter 116 may be arranged to pass only a first order holographic image. For example, the spatial filter 116 may be arranged in the optical path between the lens 118 and the lens 119 such that an opening 116a of the spatial filter 116 may coincide with the path of a first order holographic image. Depending on the path of the first order holographic image, the center of the opening 116a may be located on the optical axis of the lenses 118 and 119 or may be located off the optical axis of the lenses 118 and 119. Therefore, high order holographic images and other noise components which propagate in paths different from the path of the first order holographic image may be removed.

Figure 14:
FIGS. 14 to 18 are views illustrating various electronic devices employing holographic display apparatuses according to example embodiments.
Figure 15:
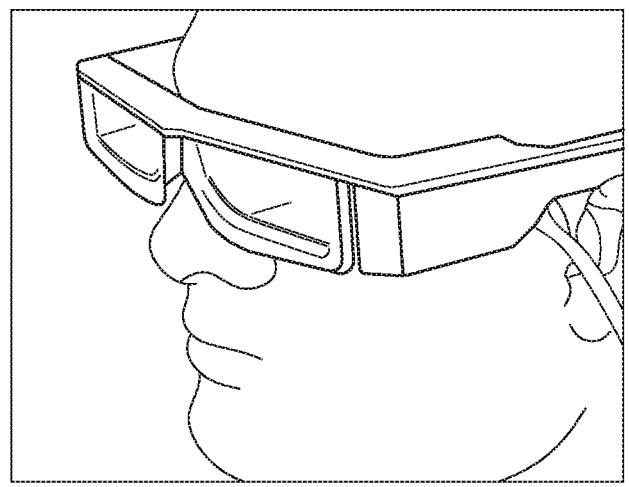
Figure 16:
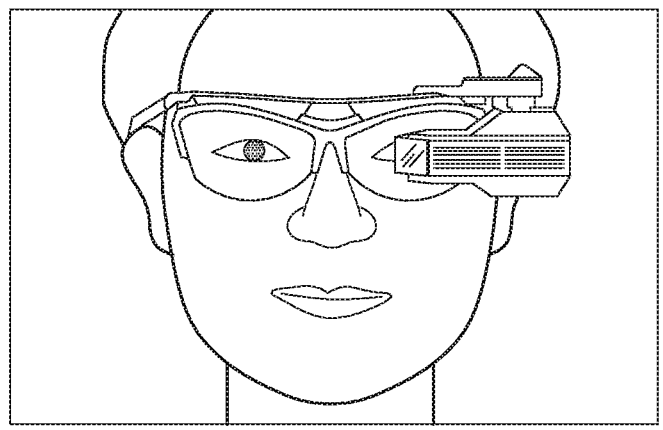

As described above, the holographic display apparatuses 100, 200, 300, 400, 500, 600, and 700 may be used to implement AR and MR. For example, FIGS. 14 to 18 illustrate various electronic devices employing the holographic display apparatuses 100, 200, 300, 400, 500, 600, and 700 of the above-described example embodiments. As illustrated in FIGS. 14 to 16, the holographic display apparatuses 100, 200, 300, 400, 500, 600, and 700 may constitute wearable devices. and may be applied to wearable devices. For example, the holographic display apparatuses 100, 200, 300, 400, 500, 600, 700 may be applied to head mounted displays (HMDs). In addition, the holographic display apparatuses 100, 200, 300, 400, 500, 600, and 700 may be applied to glasses-type displays, goggle-type displays, or the like. The wearable electronic devices shown in FIGS. 14 to 16 may be operated in an interacting relationship with smartphones. The holographic display apparatuses 100, 200, 300, 400, 500, 600, and 700 may be VR display apparatuses, AR display apparatuses, or MR display apparatuses of a head-mounted type or a glasses or goggle type capable of providing virtual reality or providing a virtual image together with an external real image.

Figure 17:
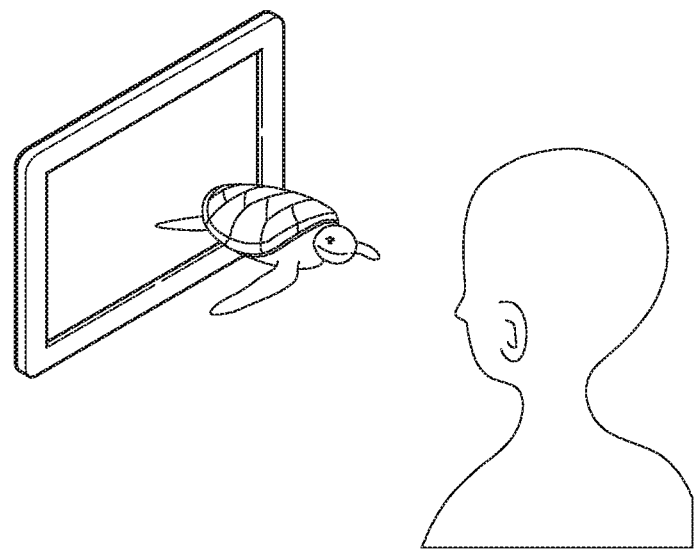
Figure 18:
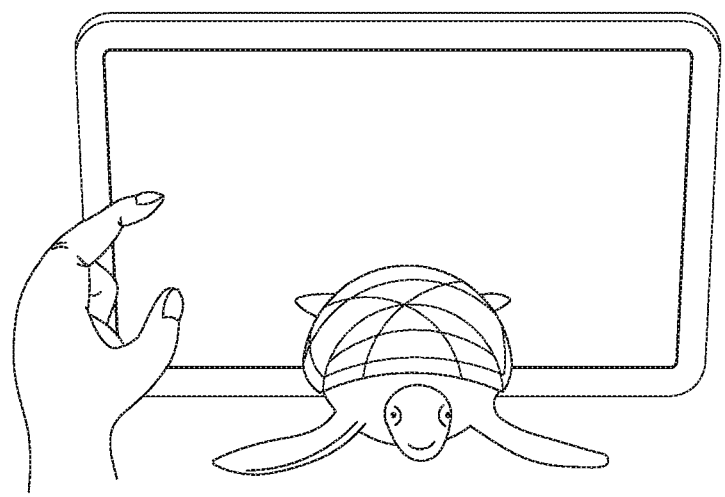

In addition, as illustrated in FIGS. 17 and 18, the holographic display apparatuses 100, 200, 300, 400, 500, 600, and 700 may be applied to mobile devices such as tablets or smartphones. In this case, the output coupler 122 may be arranged on a portion or the entirety of a front screen of a tablet or smartphone. A user may then watch holographic images on the screen of the tablet or smartphone.

Figure 19:
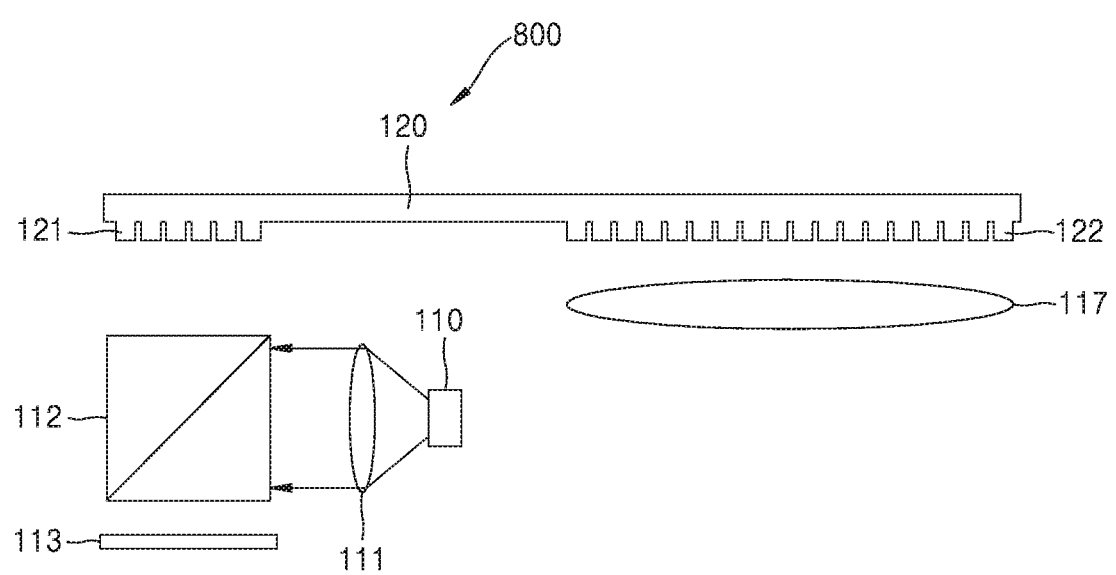
FIG. 19 is a view schematically illustrating a structure of a holographic display apparatus according to another example embodiment.

In addition, the holographic display apparatuses 100, 200, 300, 400, 500, 600, and 700 may be applied not only to glasses-type display structures but also to projection display structures. For example, FIG. 19 is a view schematically illustrating a structure of a holographic display apparatus 800 according to another example embodiment. Referring to FIG. 19, the holographic display apparatus 800 may include a light guide plate 120 having an input coupler 121 and an output coupler 122; a light source 110 configured to emit light, a spatial light modulator 113 configured to generate a holographic image by modulating light emitted from the light source 110, a beam splitter 112 arranged to face the input coupler 121, and a lens 117 arranged to face the output coupler 122.

The beam splitter 112 is configured to reflect light emitted from the light source 110 toward the spatial light modulator 113 and transmit light reflected by the spatial light modulator 113. The light reflected by the spatial light modulator 113 passes through the beam splitter 112 and enters the input coupler 121. Thereafter, the light is obliquely guided into the light guide plate 120 by the input coupler 121 and propagates in the light guide plate 120. In addition, the light is output to the outside of the light guide plate 120 through the output coupler 122. The light output through the output coupler 122 is focused in a space outside the light guide plate 120 through the lens 117. Thus, the lens 117 is a projection lens for projecting holographic images. According to the example embodiment, since holographic images, which are output over a relatively large area by the output coupler 122 having a large area, are focused using the lens 117, the viewing angle of the holographic images may increase.

Figure 20:
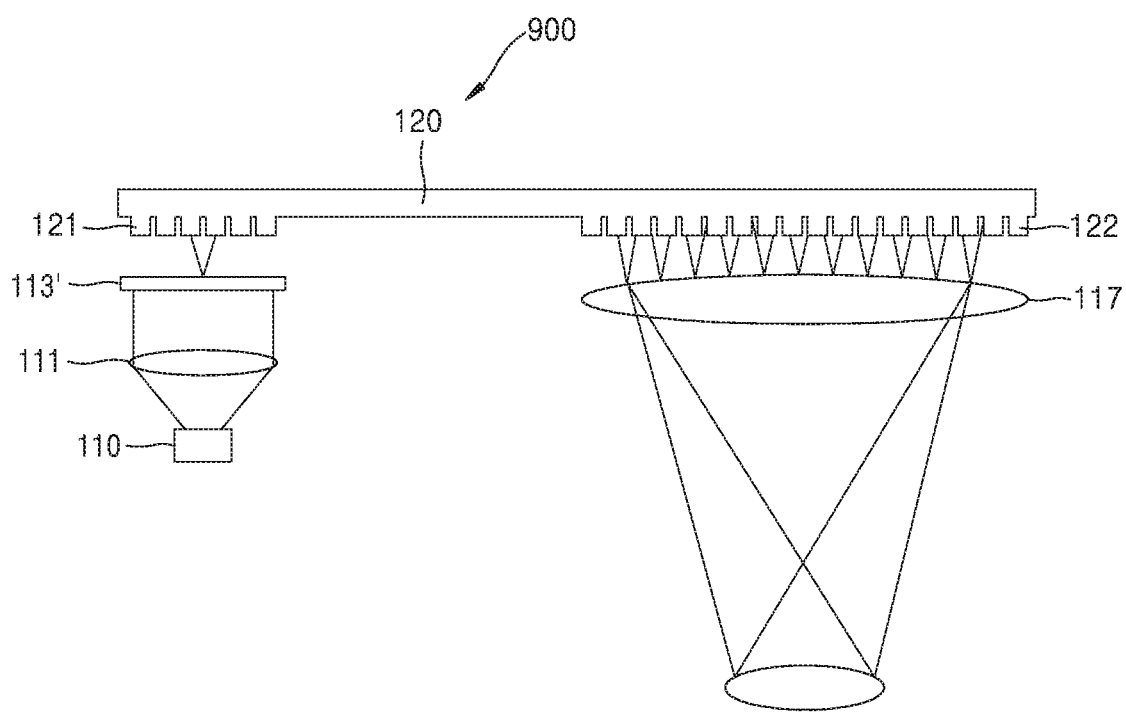
FIG. 20 is a view schematically illustrating a structure of a holographic display apparatus according to another example embodiment.

In addition, FIG. 20 is view schematically illustrating a structure of a holographic display apparatus 900 according to another example embodiment. Referring to FIG. 20, the holographic display apparatus 900 may include a light guide plate 120 including an input coupler 121 and an output coupler 122, a light source 110, a collimating lens 111, a spatial light modulator 113', and a lens 117. The light source 110, the collimating lens 111, and the spatial light modulator 113' may be sequentially arranged in the propagation direction of light to face the input coupler 121 of the light guide plate 120. Here, the spatial light modulator 113' is a transmissive spatial light modulator configured to modulate light passing therethrough. In addition, the lens 117 is arranged to face the output coupler 122, and focuses light output through the output coupler 122 in a space outside the light guide plate 120. The holographic display apparatus 900 shown in FIG. 20 is different from the holographic display apparatus 800 shown in FIG. 19 in that the holographic display apparatus 900 uses the transmissive spatial light modulator 113' instead of the reflective spatial light modulator 113.

The above-described holographic display apparatuses 800 and 900 illustrated in FIGS. 19 and 20 may be applied to mobile devices such as the tablets illustrated in FIGS. 17 and 18 or smartphones.

While holographic display apparatuses and methods for providing expanded viewing windows are described according to example embodiments with reference to the accompanying drawings, it should be understood that example embodiments described herein should be considered in a descriptive sense only and not for purposes of limitation. Descriptions of features or aspects within each embodiment should typically be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. A holographic display apparatus comprising:
   a light guide plate comprising an input coupler and an output coupler;
   a holographic image generating assembly configured to generate a holographic image and provide the holographic image to the input coupler of the light guide plate; and
   an image processor configured to convert source image data based on a point spread function, which is obtained for each pixel of the holographic image on an image plane, to compensate for a blur of the holographic image output through the output coupler,
   wherein the image processor comprises a first matrix which is previously obtained and stored and a second matrix which is previously obtained and stored, and
   wherein the image processor is further configured to convert first source image data having first depth information based on the first matrix and convert second source image data having second depth information based on the second matrix.

2. The holographic display apparatus of claim 1, wherein the light guide plate comprises a first surface and a second surface which is opposite the first surface, and wherein the input coupler and the output coupler are provided on the first surface.

3. The holographic display apparatus of claim 1, wherein the holographic image generating assembly comprises:
   a light source configured to emit light; and
   a spatial light modulator configured to modulate light emitted from the light source to generate a holographic image.

4. The holographic display apparatus of claim 3, wherein the spatial light modulator is a reflective spatial light modulator configured to reflect and modulate light, and
   wherein the holographic image generating assembly further comprises a beam splitter configured to transmit light emitted from the light source to the spatial light modulator and transmit light reflected by the spatial light modulator to the input coupler.

5. The holographic display apparatus of claim 4, wherein the beam splitter is a polarization beam splitter configured to reflect light having a first linear polarization component and transmit light having a second linear polarization component which is orthogonal to the first linear polarization component.

6. The holographic display apparatus of claim 5, wherein the holographic image generating assembly further comprises a quarter-wave plate between the beam splitter and the spatial light modulator.

7. The holographic display apparatus of claim 5, wherein the light source comprises a first light source configured to emit light having the first linear polarization component and a second light source configured to emit light having the second linear polarization component, and
   wherein the spatial light modulator comprises a first spatial light modulator configured to modulate light reflected by the beam splitter and a second spatial light modulator configured to modulate light passing through the beam splitter.

8. The holographic display apparatus of claim 7, wherein the first spatial light modulator and the second spatial light modulator are configured to operate in a time-division manner.

9. The holographic display apparatus of claim 3, wherein the spatial light modulator is a transmissive spatial light modulator configured to transmit and modulate light.

10. The holographic display apparatus of claim 3, wherein the holographic image generating assembly further comprises a lens configured to focus a holographic image provided by the spatial light modulator on the input coupler.

11. The holographic display apparatus of claim 10, wherein a distance between the lens and the input coupler and a distance between the lens and the spatial light modulator are respectively equal to a focal length of the lens.

12. The holographic display apparatus of claim 10, wherein a distance between the lens and the input coupler is equal to a focal length of the lens, and a distance between the lens and the spatial light modulator is greater than the focal length of the lens.

13. The holographic display apparatus of claim 3, wherein the holographic image generating assembly further comprises a spatial filter provided to face the input coupler and configured to limit light incident on the input coupler.

14. The holographic display apparatus of claim 3, wherein the holographic image generating assembly further comprises:
   a spatial filter configured to remove undesired image noise and high order holographic images which are generated by the spatial light modulator;
   a first lens provided between the spatial light modulator and the spatial filter and configured to project light provided from the spatial light modulator onto the spatial filter;
   a second lens configured to transmit a holographic image passing through the spatial filter; and
   a third lens provided between the second lens and the input coupler of the light guide plate and configured to project the holographic image delivered from the second lens onto the input coupler.

15. The holographic display apparatus of claim 1, further comprising a lens provided to face the output coupler and configured to project a holographic image output through the output coupler onto the image plane.

16. The holographic display apparatus of claim 1, wherein the light guide plate further comprises an intermediate coupler provided in an optical path between the input coupler and the output coupler,
   wherein the input coupler is configured such that light input to the input coupler propagates in the light guide plate in a first direction,
   wherein the intermediate coupler is configured such that light input to the intermediate coupler propagates in the light guide plate in a second direction orthogonal to the first direction, and
   wherein the output coupler is configured such that light input to the output coupler is output from the light guide plate in a third direction orthogonal to the first direction and the second direction, respectively.

17. The holographic display apparatus of claim 16, wherein a width of the intermediate coupler in the first direction is greater than a width of the input coupler in the first direction, and a width of the output coupler in the second direction is greater than a width of the intermediate coupler in the second direction.

18. The holographic display apparatus of claim 3, wherein the image processor is further configured to obtain a computer generated hologram (CGH) based on the converted source image data and provide a CGH signal to the spatial light modulator.

19. The holographic display apparatus of claim 1, wherein the first matrix and the second matrix are previously obtained by:
   estimating test holographic images to be reproduced on the image plane by obtaining point spread functions at every pixels respectively for a first depth based on first test source image data having the first depth information and a second depth based on second test source image data having the second depth information;
   comparing the test holographic image estimated for the first depth with a target holographic image for the first depth to correct the first test source image data to decrease a difference between the test holographic image and the target holographic image below a certain value;
   comparing the test holographic image estimated for the second depth with the target holographic image for the second depth to correct the second test source image data to decrease the difference between the test holographic image and the target holographic image below the certain value;
   obtaining the first matrix to convert the first test source image data into the corrected first test source image data; and
   obtaining the second matrix to convert the second test source image data into the corrected second test source image data.

20. A holographic display method comprising:
- providing a computer generated hologram (CGH) signal to a spatial light modulator to generate a holographic image;
- providing the holographic image to an input coupler of a light guide plate; and
- reproducing, on an image plane, the holographic image which is propagated inside the light guide plate and is output through an output coupler of the light guide plate,
- wherein the providing of the CGH signal to the spatial light modulator comprises:
  - converting source image data based on a point spread function, which is obtained using an image processor for each pixel of the holographic image on the image plane, to compensate for a blur of the holographic image output through the output coupler; and
  - obtaining a CGH based on the converted source image data,
- wherein the image processor comprises a first matrix which is previously obtained and stored and a second matrix which is previously obtained and stored.

21. The holographic display method of claim 20, wherein the first matrix and the second matrix are previously prepared by:
- estimating test holographic images to be reproduced on the image plane by obtaining per-pixel point spread functions respectively for a first depth based on first test source image data having first depth information and a second depth based on second test source image data having second depth information;
- comparing the test holographic image estimated for the first depth with a target holographic image for the first depth to correct the first test source image data to decrease a difference between the test holographic image and the target holographic image below a certain value;
- comparing the test holographic image estimated for the first depth with the target holographic image for the second depth to correct the second test source image data to decrease the difference between the test holographic image and the target holographic image below the certain value;
- obtaining the first matrix to convert the first test source image data into the corrected first test source image data; and
- obtaining the second matrix to convert the second test source image data into the corrected second test source image data.

22. A holographic display apparatus comprising:
- a light guide plate comprising an input coupler and an output coupler, a size of the output coupler being greater than a size of the input coupler;
- a holographic image generating assembly configured to generate a holographic image and provide the holographic image to the input coupler of the light guide plate; and
- an image processor configured to convert source image data having a depth information based on a matrix that is previously obtained and stored,
- wherein the image processor comprises a first matrix which is previously obtained and stored and a second matrix which is previously obtained and stored, and
- wherein the image processor is further configured to convert first source image data having first depth information based on the first matrix and convert second source image data having second depth information based on the second matrix.

23. The holographic display apparatus of claim 22, wherein the matrix is previously obtained by:
- estimating test holographic images to be reproduced on an image plane by obtaining point spread functions at every pixels respectively for a depth based on test source image data having the depth information;
- comparing the test holographic image estimated for the depth with a target holographic image for the depth to correct the test source image data to decrease a difference between the test holographic image and the target holographic image below a certain value; and
- obtaining the matrix to convert the test source image data into the corrected test source image data.

* * * * *